United States Patent [19]

Higashi et al.

[11] Patent Number: 4,919,696
[45] Date of Patent: Apr. 24, 1990

[54] SUPERCOOLING TYPE MIST ELIMINATOR APPARATUS

[75] Inventors: Tsuneo Higashi, Mihara; Akio Izuwa, Hiroshima, both of Japan

[73] Assignee: Mitsubishi Jukogyo Kabushiki Kaisha, Tokyo, Japan

[21] Appl. No.: 262,877

[22] Filed: Oct. 26, 1988

[30] Foreign Application Priority Data

Oct. 30, 1987 [JP] Japan .................................. 62-273464

[51] Int. Cl.$^5$ ........................ B01D 35/18; B01D 46/40
[52] U.S. Cl. .......................................... 55/269; 55/440
[58] Field of Search .................. 55/185, 195, 267–269, 55/278, 440–444

[56] References Cited

U.S. PATENT DOCUMENTS

| 1,422,839 | 7/1922 | deClamecy | 55/440 X |
| 1,673,732 | 6/1928 | Brooks | 55/440 X |
| 2,324,193 | 7/1943 | Brunel | 55/195 X |
| 2,663,547 | 12/1953 | Evans, Jr. et al. | 55/195 X |
| 2,848,197 | 8/1958 | Evans, Jr. et al. | 55/195 X |
| 3,785,127 | 1/1974 | Mare | 55/440 X |
| 3,800,505 | 4/1974 | Tarves, Jr. | 55/269 X |
| 3,925,040 | 12/1975 | Fattinger | 55/440 X |
| 4,334,897 | 6/1982 | Brady et al. | 55/440 X |
| 4,642,127 | 2/1987 | Ando et al. | 55/267 X |
| 4,682,549 | 7/1987 | Hall | 55/269 X |
| 4,704,972 | 11/1987 | Marchand | 55/269 X |
| 4,763,721 | 8/1988 | Becker | 55/267 X |

FOREIGN PATENT DOCUMENTS 59-016526  1/1984  Japan ...................................... 55/267

Primary Examiner—Robert Spitzer
Attorney, Agent, or Firm—Wenderoth, Lind & Ponack

[57] ABSTRACT

A supercooling type mist eliminator apparatus has a crimped-plate type mist eliminator for removing particles of dust and mist contained in a wet exhaust gas by inertial collision. The apparatus has an exhaust gas cooling device disposed upstream of the crimped-plate type mist eliminator including supercooling elements and non-cooling sections alternately disposed adjacent to one another via a gas passageway partition plate along a plane perpendicular to the direction of the gas flow in the gas passageway. An exhaust gas mixing device is disposed upstream of the crimped-plate type mist eliminator and just behind and close to the exhaust gas cooling device.

4 Claims, 2 Drawing Sheets

SUPERCOOLING TYPE MIST ELIMINATOR APPARATUS

BACKGROUND OF THE INVENTION

1. Field of the Invention

The present invention relates to a supercooling type mist eliminator apparatus applicable to a wet type exhaust gas desulfurization system, a dust-removing system and a dust enlarging system for use in wet type electric dust collectors.

2. Description of the Prior Art

A known wet type exhaust gas desulfurization system for coal burning thermal power is schematically shown in FIG. 4. A wet type exhaust gas desulfurization system (hereinafter abbreviated as "desulfurization system") is a system normally comprising a quenching tower, an absorption tower and an eliminator. In FIG. 4, exhaust gas is introduced through an exhaust gas duct 11 into a gas gas heater 1 (hereinafter abbreviated as GGH heat extractor. After exhaust gas heat has been collected at the GGH heat extractor, the exhaust gas is sent to a quenching tower 2, in which the dust in the exhaust gas is removed by the spraying of coolant water and the exhaust gas is humidified and cooled. Thereafter, the exhaust gas is led to an absorption tower 3, in which $SO_2$ contained in the exhaust gas is absorbed and removed by an absorbent liquid. Subsequently, after gypsum mist generated in the absorption tower 3 has been removed in an eliminator 4, residual dust in the exhaust gas is removed in a wet type electrostatic precipitator 5 (hereafter abbreviated as WEP). In succession, in another gas gas heater 6 (hereinafter abbreviated as GGH reheater), the exhaust gas is heated and raised in temperature by the heat collected by the GGH heat extractor 1, and then exhausted to the atmosphere through a stack. It is to be noted that the dust concentration in the outlet exhaust gas of the eliminator 4 cannot be reduced to 10 $mg/m^3N$ or less, because removal of micro-fine particles is difficult in the eliminator. Therefore, in order to reduce the dust concentration in the exhaust gas exhausted to the atmosphere to less than 10 $mg/m^3N$, dust is further removed by means of the WEP 5. In addition, for the purpose of removing gypsum mist of the absorption tower 3 which deposits on crimped-plate-shaped elements of the eliminator 4, as shown in FIG. 5, water supplied externally of the system through a pipe 9 is sprayed over the elements through spray nozzles. After having removed the gypsum deposited on the elements, this spray water is fed to the quenching tower 2 through a pipe 10 and serves as supplementary water for the coolant water evaporated and dissipated into the exhaust gas.

In the crimped-plate type mist eliminator known in the prior art, it is difficult to effectively remove dust having a micro-fine particle diameter. In the case of the above-described known desulfurization system, in order to reduce a dust concentration in the exhaust gas at the outlet of the eliminator to 10 $mg/m^3N$ or less, dust removal is further effected by means of a WEP, resulting in that plant and equipment investment is increased, a large plant site is necessitated and running costs become large.

Also, there is a problem that while the water supplied externally of the system is used for washing out dust or gypsum deposited on the elements of the eliminator and thereafter fed to the quenching tower to serve as supplementary water for a coolant water, since a large amount of water cannot be used for the reason that, as a large amount of water is used, drain water increases, washing of the elements would become insufficient, gypsum would remain on the elements, and, in the worst case, partial blocking may arise.

SUMMARY OF THE INVENTION

The present invention has been worked out in view of the above-mentioned current status of the art, and the invention has as an object to provide a novel mist eliminator apparatus in which dust and mist having a minute particle diameter can be effectively removed, and washing of a mist eliminator as well as feeding of supplementary water to a quenching tower can be achieved almost without relying upon supplementary water supplied externally of the system, and thereby the amount of water supplied externally of the system can be reduced.

According to one feature of the present invention, there is provided a supercooling type mist eliminator apparatus provided with a crimped-plate type mist eliminator for removing particles of dust and mist contained in a wet exhaust gas by initial collison means, which comprises exhaust gas cooling means disposed upstream of the crimped-plate type mist eliminator and including supercooling elements and non-cooling sections alternately disposed adjacent to one another via a gas passageway partition plate along a plane perpendicular to the direction of a gas flow in a gas passageway, and exhaust gas mixing means disposed upstream of the crimped-plate type mist eliminator and just behind and close to the exhaust gas cooling means.

According to the present invention, in a mist eliminator apparatus available in a desulfurization system or the like, a novel structure is employed such that there are provided exhaust gas cooling means for further cooling a part of saturated exhaust gas and exhaust gas mixing means disposed downstream of the exhaust gas cooling means for quickly mixing the residual saturated exhaust gas that is not cooled with the above-mentioned cooled saturated exhaust gas, and dust and/or mist having its particles enlarged by the mixing is fed to a crimped-plate type mist eliminator to be removed, the exhaust gas is brought into a supersaturated condition by mixing an uncooled saturated exhaust gas with a cooled saturated exhaust gas, so that steam in the exhaust gas may condense on the surface of the dust particles in the exhaust gas serving as nuclei of condensation, resulting in enlargement of the particle diameters of the mist. The thus enlarged mist particles can be more effectively captured and removed by the crimped-plate type mist eliminator, micro-fine dust particles in the exhaust gas can be also removed jointly with the enlarged mist particles, and therefore, a dust concentration of the exhaust gas at the outlet of a desulfurization system can be reduced, for example, to 10 $mg/m^3N$ or less without making use of a WEP. In addition, a recovered water cooled and condensed in this mist eliminator can be resprayed in a large amount at the exhaust gas cooling means of the mist eliminator or in the crimped-plate type mist eliminator, thereby deposition of dust and gypsum mist can be perfectly eliminated, still further this recovered water can be supplemented to fresh water supplied to the cooling tower, and thereby minimization of an amount of disposal of drain water can be achieved.

The above-mentioned and other objects, features and advantages of the present invention will become more

DESCRIPTION OF THE PREFERRED EMBODIMENT

Figure 1:
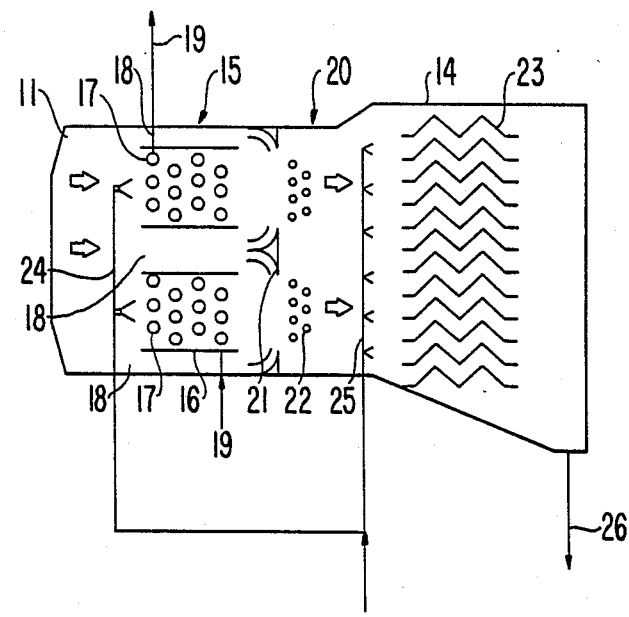
FIG. 1 is a schematic view of one preferred embodiment of the present invention.

The preferred embodiment of the present invention will be described with reference to FIGS. 1 to 3.

Figure 2:
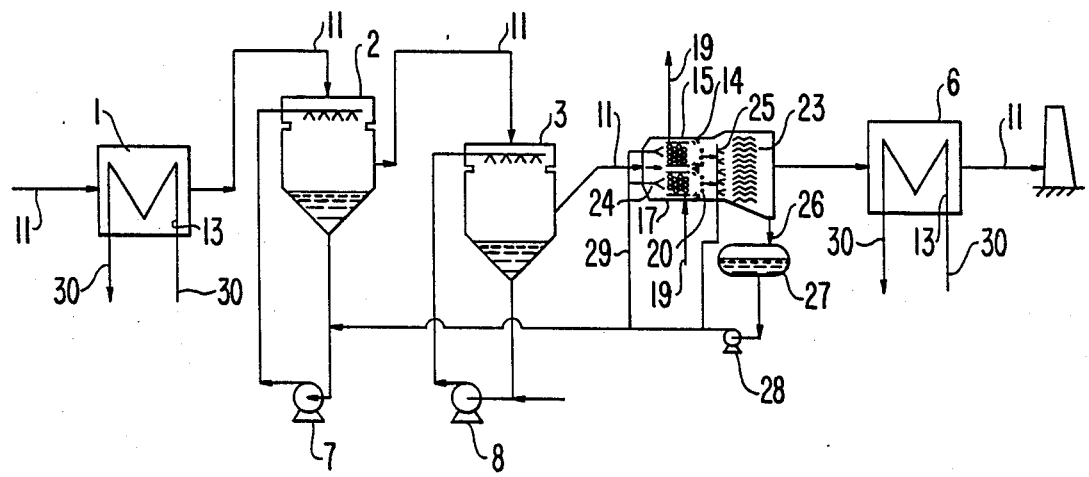
FIG. 2 is a schematic view of a wet type exhaust gas desulfurization system provided with a supercooling type mist eliminator apparatus according to the present invention.
Figure 3:
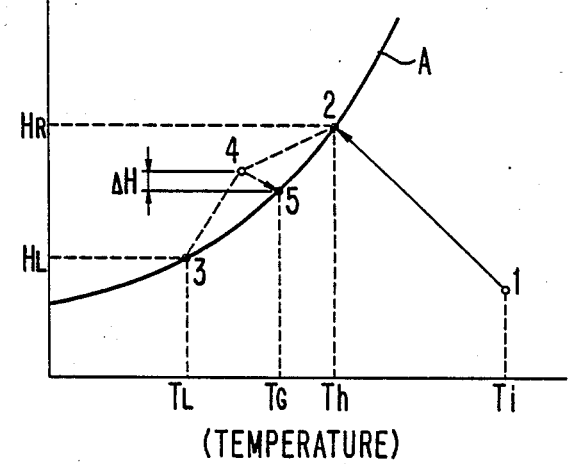
FIG. 3 is a phase diagram of an exhaust gas represented on a temperature-humidity diagram to be referred to for understanding an operating principle of the present invention.
Figure 4:
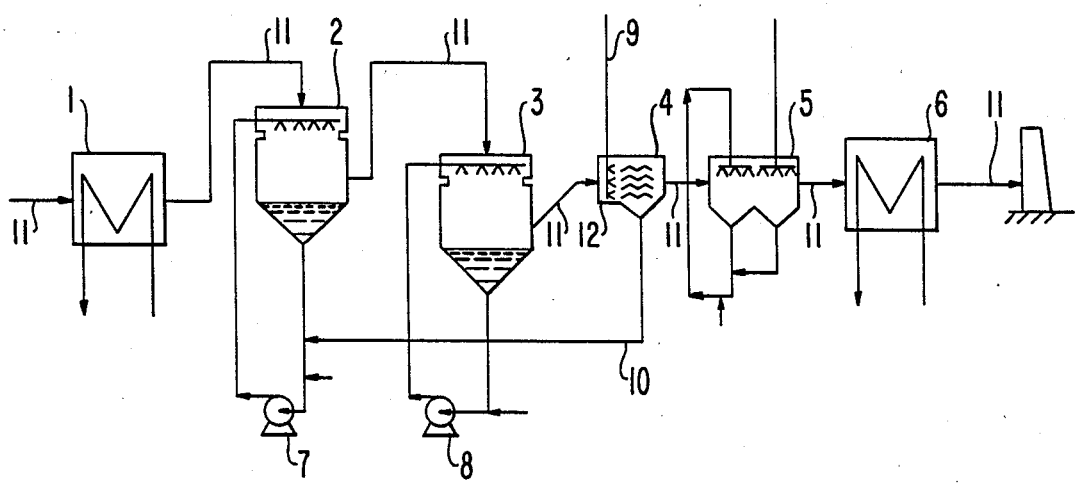
FIG. 4 is a schematic view of a wet type exhaust gas desulfurization system of the prior art.
Figure 5:
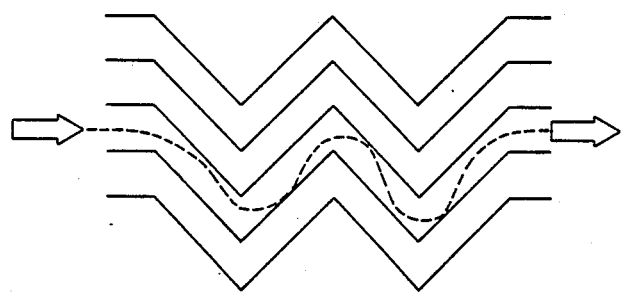
FIG. 5 is a schematic view showing elements of a known crimped-plate type mist separator.

In FIG. 2, a coal fired exhaust gas exhausted from a boiler enters through an exhaust gas duct 11 into a GGH heat extractor 1, in which the exhaust gas heats up a thermal medium (water) within a heat transfer tube 13 to raise its temperature. After having been cooled to 90°-100° C., the exhaust gas then enters a quenching tower 2, in which a coolant water fed by means of a circulation pump 7 is sprayed into the exhaust gas. The exhaust gas here is humidified and cooled and has dust removed, and transfers from state 1 to state 2 in the diagram shown in FIG. 3. $SO_2$ in the exhaust gas then absorbed by an absorbent liquid fed by an absorption tower circulation pump 8 and sprayed into the exhaust gas in a subsequent absorption tower 3. Then, the exhaust gas is introduced into a supercooling type mist eliminator 14 according to the present invention. The supercooling type mist eliminator 14 according to the present invention will be explained in greater detail with reference to FIG. 1. In FIG. 1, a reference numeral 15 designates an exhaust gas cooling device disposed upstream of a crimpedplate type mist separator 23, with respect to the direction of gas flow. Reference numeral 16 designates gas passageway partition plates in the exhaust gas cooling device 15, numeral 17 designates supercooling elements perpendicular to the direction of gas flow in a gas flow passageway, and numeral 18 designates non-cooling sections adjacent to the supercooling elements 17 via the gas passageway partition plate 16. The above-mentioned supercooling elements 17 and the non-cooling sections 18 are alternately disposed adjacent to one another via a gas passageway partition plate along a plane perpendicular to the direction of a gas flow, and a coolant water pipe 19 is connected to the above-described supercooling elements 17. In addition, reference numeral 20 designates an exhaust gas mixing device disposed upstream of the crimped-plate type mist separator 23 and just behind the exhaust gas cooling means 15. Reference numeral 21 designates a gas mixer in the exhaust gas mixing device, which gas mixer 21 includes a mechanism for diverting the gas flow emanating from the non-cooling sections 18 in the exhaust gas cooling device 15 so as to intersect the gas flow emanating from the supercooling elements 17, as shown in FIG. 1. Reference numeral 22 designates a rod type (or plate type) gas mixer disposed close to the gas mixer 21. In the rod type (or plate type) gas mixer 22 are horizontally disposed a plurality of rods (or plates) so as to intersect with a gas flow as shown in FIG. 1, and thereby turbulence is produced in the gas flow to promote mixing of the gases. Reference numeral 24 designates spray nozzles disposed upstream of and close to the exhaust gas cooling device 15 for washing the exhaust gas cooling device 15, and numeral 25 designates spray nozzles just in front of the crimped-plate type mist separator 23 for washing the crimped-plate type mist separator 23. A part of the exhaust gas that has flowed into the supercooling type mist eliminator 14 passes through the supercooling elements to which cooling water is fed through a cooling water pipe 19, wherein the exhaust gas is dehumidified and cooled, and transfers from state 2 to state 3 along a saturation curve A in the diagram shown in FIG. 3.

The residual exhaust gas passes through the non-cooling section 18. The cooled exhaust gas (state 3 in the diagram shown in FIG. 3) and the uncooled exhaust gas (state 2 in the diagram in FIG. 3) are quickly mixed by the gas mixer 21 and the rod type (or plate type) gas mixer 22 in the exhaust gas mixing device 20, and a state 4 in the diagram in FIG. 3, that is, a supersaturated state, is established. In the mixed exhaust gas at the supersaturated state, steam corresponding to $\Delta H$ in the graph in FIG. 3 condenses and grows on the surfaces of the dust particles, using dust in the exhaust gas as nuclei of condensation, and thereby particle diameters of the dust are enlarged. The exhaust gas transfers from state 4 to state 5 in the diagram shown in FIG. 3. The enlarged dust particles enter into the crimped-plate type mist separator 23, and are removed by inertial collision. Also, condensate water produced in the exhaust gas cooling device 15 and condensate water produced by the gas mixing device 20 are collected and led to a condensate water pipe 26.

In FIG. 2, the collected condensate water is accumulated in a condensate water tank 27, and is then sprayed from the spray nozzles 24, 25 to the supercooling elements 17 and the crimped-plate type mist separator 23, via a condensate water pipe 29 and by means of a condensate water pump 28, to remove the deposited gypsum mist and dust. The sprayed condensate water is also collected again.

Thereafter, the exhaust gas enters the GGH reheater 6, in which thermal medium water raised in temperature in the GGH heat extractor 1 and supplied through a thermal medium pipe 30 enters a heat transfer tube 13 to heat the exhaust gas up to a predetermined temperature. The exhaust gas is then exhausted into the atmosphere through a stack.

By installing the apparatus according to the present invention, the dust concentration in the outlet exhaust gas of the desulfurization system can be reduced to a predetermine value, so that it is unnecessary to further provide a WEP downstream of the system, as is the case with the prior art system.

In addition, there is an advantage in that in the supercooling type mist eliminator apparatus the condensate water condensed in the exhaust gas and collected can be effectively utilized for washing of the supercooling type mist eliminator, and can also be used as supplementary water fed to the cooling tower.

As described in detail above, with the supercooling type mist eliminator apparatus according to the present invention, the following advantages are obtained:

(1) Since a dust concentration in an outlet exhaust gas of a desulfurization system or the like can be greatly reduced by installing the supercooling type mist eliminator apparatus, a WEP becomes unnecessary, there is a great reduction of initial plant and equipment investment, the site area can be reduced, and a reduction in running costs can be realized.

(2) Since condensate water produced in the supercooling type mist eliminator apparatus can be collected and utilized to be sprayed over a mist separator for washing deposited dust, gypsum, etc., and can also be utilized as supplementary water for a quenching tower, the saving of running costs, as well as a countermeasure against the shortage of water, can be achieved.

While a principle of the present invention has been described above in connection to one preferred embodiment of the present invention, it is a matter of course that many apparently widely different embodiments of the present invention could be made without departing from the spirit of the present invention.

What is claimed is:

1. A supercooling type mist eliminator apparatus, comprising:

a gas passageway adapted to have flowing therethrough a wet exhaust gas containing particles of dust and mist;

a crimped-plate mist eliminator in said gas passageway for removing by inertial collision the particles of dust and mist contained in the wet exhaust gas;

an exhaust gas cooling means disposed upstream of said crimped-plate mist eliminator, said exhaust gas cooling means including supercooling elements and non-cooling sections alternately disposed adjacent to one another along a plane perpendicular to the direction of gas flow in said gas passageway, said supercooling elements and said noncooling sections being separated by gas passageway partition plates; and an exhaust gas mixing means disposed upstream of said crimped-plate mist eliminator and just downstream of and adjacent to said exhaust gas cooling means.

2. The supercooling type mist eliminator apparatus as set forth in claim 1, wherein:

said exhaust gas cooling means comprises two groups of said supercooling elements, each said group having on opposite sides thereof a said gas passageway partition plate; and said non-cooling sections comprises a first noncooling section between said two groups, and second and third non-cooling sections on respective sides of said two groups opposite said first non-cooling section.

3. The supercooling type mist eliminator apparatus as set forth in claim 2, wherein said exhaust gas mixing means comprises:

an exhaust gas diverter adapted to divert exhaust gas flow from said respective non-cooling sections toward exhaust gas flow from said supercooling elements to combine the exhaust gas flows; and a gas flow mixer adjacent to and downstream from said exhaust gas diverter adapted to mix the combined exhaust gas flows.

4. The supercooling type mist eliminator apparatus as set forth in claim 1, wherein said exhaust gas mixing means comprises:

an exhaust gas diverter adapted to divert exhaust gas flow from said non-cooling sections toward exhaust gas flow from said supercooling elements to combine the exhaust gas flows; and a gas flow mixer adjacent to and downstream from said exhaust gas diverter adapted to mix the combined exhaust gas flows.

* * * * *